Nov. 1, 1960  U. VON KRITTER ET AL  2,958,414
APRON CONVEYOR
Filed March 11, 1958
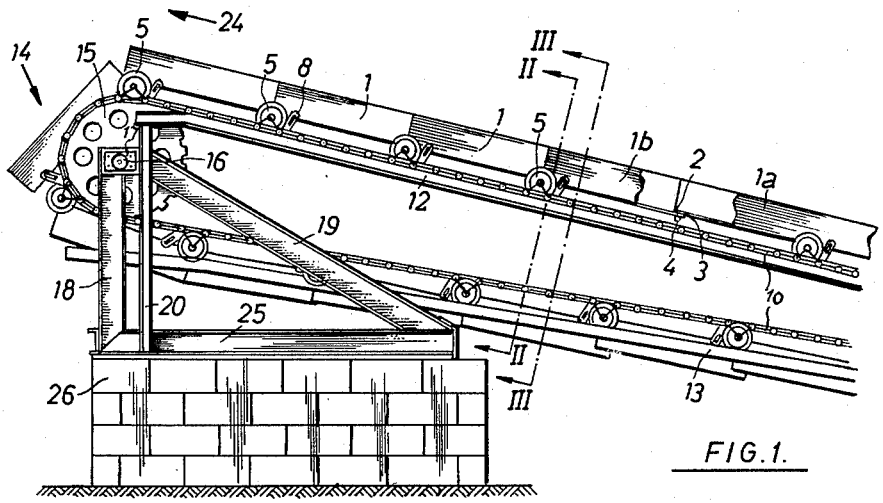
FIG.1.
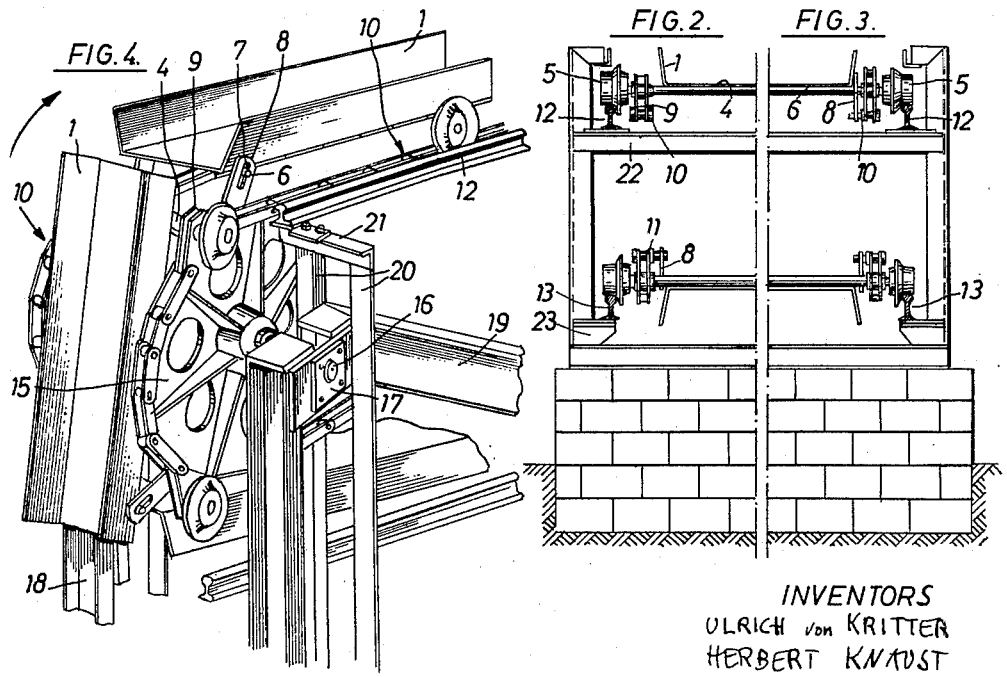
FIG.2.   FIG.3.
FIG.4.
INVENTORS
ULRICH von KRITTER
HERBERT KNAUST
By
AGENT

United States Patent Office 2,958,414
Patented Nov. 1, 1960

2,958,414

APRON CONVEYOR

Ulrich von Kritter and Herbert Knaust, both of Heinrich von Kleiststrasse 2, Bad Homburg von der Hohe, Germany Filed Mar. 11, 1958, Ser. No. 720,784

4 Claims. (Cl. 198—196)

The present invention relates to apron conveyors, such as are used for transport of granular, powdery and other comminuted materials, and more particularly to a novel attachment of skirted or skirtless bottom plates to endless chains of a horizontal or inclined conveyor.

An important object of the invention is to provide improved apron conveyors of the type comprising two endless chains driven in vertical planes by spaced sprockets, and a plurality of overlapping steel bottom plates articulately connected with the chains in such manner that the conveyor requires little room at each end turn of relatively small radius. The novel connection is of particular advantage in conveyors provided with skirted or skirtless bottom plates whose length is a multiple of the length of the chain links and which, in similar apparatus of known construction, require considerable room at each end turn where the direction of the chains' movement is reversed.

It is a further aim of the invention to use chains having no projecting securing means on the upper and under sides so that it is possible to use rail guides and ordinary presser rollers for the purpose of preventing the conveyor from lifting off in the travel trough troughs, and possibly also intermediate drive arrangements with pressure chains over the chains. Therefore, the securing arrangement between the chains and the plate troughs is so constructed, that the spindles secured to the plate troughs do not project into the free space over the upper and under sides of the drawing chains.

A further object of the invention is to provide an improved apron conveyor which is simple in construction and safe in operation without jamming or breakage at the end turns where the receptacles are led over sprockets to reverse the direction of their movement.

The invention resides essentially in an articulate connection between skirted or skirtless bottom plates and the endless chains of an apron conveyor, the connection permitting entry of plates, whose length is a multiple of that of a single chain link, into the area between the spaced sprockets at each end turn of the conveyor and thus considerably reducing the space required to permit the travel of such bottom plates in apron conveyors of known construction. To that end, there is provided a pair of transverse axles in the proximity of respective longitudinal ends of each bottom plate. One axle has limited freedom of movement with respect to the adjacent endless chains to which it is secured by means of a pair of connecting members. Each connecting member has an elongated closed slot to receive the adjacent extremity of such an axle, the length of slots in connecting members determining the extent of movement of a bottom plate with respect to the endless chains. The other axle of each bottom plate has its ends rotatably received in a pair of bearing members extending from the adjacent endless chain at two sides of the conveyor. The bearing members may be in the form of chain links so constructed as to rotatably receive the second axle of an adjacent bottom plate. This last mentioned axle carries a pair of wheels running on rails adjacent to the upper and lower stringers of the chains.

Since the distance between said chains is greater than the width of the bottom plates, the latter may enter the area between the sprockets at each end turn of the conveyor. This is an important advantage since relatively long bottom plates may be led over a pair of sprockets whose diameters are even smaller than the overall length of a plate while requiring surprisingly little room at each end turn of the conveyor system.

Other features, advantages and attributes of the improved conveyor will become apparent in the course of the following detailed description of a specific embodiment selected for illustration in the accompanying drawing, and the invention will be finally pointed out in the appended claims.

In the drawing,

Fig. 1 is a partial view in side elevation of one embodiment of the conveyor with the skirts on two bottom plates partly broken away;

Figs. 2 and 3 are transverse sections through different halves of the conveyor taken, respectively, on lines II—II and III—III of Fig. 1; and Fig. 4 is an enlarged perspective view of an end turn of the conveyor.

Referring now in detail to the embodiment of Figs. 1 to 4, the conveyor therein shown comprises a plurality of overlapping skirted bottom plates forming receptacles 1, the overlap being best illustrated in Fig. 1 wherein the skirts of receptacles 1a and 1b closer to the observer are partly broken away to show that the front end 2 of receptacle 1a overlaps the trailing end 3 of preceding member 1b, thus forming a continuous channel along the upper stringers of conveyor chains 10. Each receptacle carries at its side facing the chains a pair of spaced transverse axles. Axle 4 at the rear end of each receptacle supports a pair of wheels 5 while the front axle 6 has its ends received in elongated slots 7 provided in connecting elements or lugs 8 which are connected to the inwardly extended chain studs 11. Axle 4 of each receptacle 1 is received in bearings 9 which, in the embodiment of Figs. 1 to 4, are specially shaped lugs of chains 10.

Wheels 5 travel on rails 12 outwardly adjacent to the upper stringers of chains 10, and on rails 13 parallel with the lower stringers. These rails extend into the immediate proximity of end turn 14 of the conveyor where the direction of movement of chains 10 is reversed as they travel over spaced sprockets 15 mounted on shafts 16. Shafts 16 are rotatable in bearings 17 which are mounted on supports consisting of profiled members 18 and 19. The lower terminals of members 18, 19 are connected by a horizontal 25 resting on the brickwork 26. Each support is connected with a pair of props 20 whose upper ends carry girders 21 to which the ends of rails 12 are secured. Between the longitudinal ends of the conveyor, rails 12 are supported on spaced girders 22 extending transversely of and beneath the upper stringers of chains 10. The lower rails 13 rest on short horizontal supports 23. No girders are shown for the lower rails since the receptacles are empty while moving along the lower stringers of the endless chains.

In Fig. 1, the receptacles 1 are assumed to travel in the direction of arrow 24. Along the upper stringers of chains 10, the receptacles 1 form a continuous channel and are consecutively reversed as they travel about sprockets 15 to return in inverted position along the lower stringers. When the wheels 5 reach the ends of rails 12, the weight of receptacles 1 is taken over by the sprockets while the conveyed material is unloaded and the empty receptacles travel about the sprockets until their wheels reach the lower rails 13. While traveling on the end turn 14 of the conveyor system, the receptacles 1 enter the space between sprockets 15 and their undersides thus define secants of a circle described by the periphery of each sprocket. By having their axles 6 received in slots 7, the receptacles have sufficient freedom of movement with respect to the chains, as is shown in Fig. 4, and any jamming or breakage at the end turn 14 is effectively prevented.

It will be understood that the novel connection is equally applicable in apron conveyors with skirtless receptacles, that is, in which the receptacles consist merely of a bottom plate or platform without side walls.

What we claim and desire to protect by Letters Patent is:

1. In an apron conveyor, in combination: a pair of endless chains movable in spaced parallel vertical planes and each comprising a plurality of links with selected aligned links of said chains constituting pairs of straight bearings each located in the plane of one of said chains, and studs pivotally connecting the links with each other, selected aligned pairs of said studs extending from the planes of said chains; spaced sprockets at each end turn of the conveyor for reversing the direction of movement of said chains; a plurality of overlapping bottom plates disposed between the planes of said chains, each bottom plate having two longitudinal ends, each being of a width less than the distance between said chains, and each being of a length which is a multiple of the length of a single chain link; a first transverse axle for each bottom plate, each said axle fixed to the underside and adjacent to one longitudinal end of the respective bottom plate, and each said axle having two ends projecting beyond the respective bottom plate and rotatably received in a pair of said straight bearings for pivotally mounting the respective bottom plate on said chains; a second transverse axle fixed to the underside and adjacent to the other longitudinal end of each bottom plate, each said second axle having two extremities projecting beyond the respective bottom plate; and a plurality of pairwise arranged lugs each pivotally fixed to one of said selected studs, each located in a plane parallel with the planes of said chains, and each having an elongated closed slot for receiving an extremity of one of said second axles whereby the lugs and the second axles connect the bottom plates with said chains in such a way that the last mentioned end of each bottom plate has freedom of movement toward and away from the chains, the length of said movement being equal to the length of said closed slots.

2. The combination as set forth in claim 1, wherein the forward longitudinal end of each bottom plate, as seen in the direction of movement of said chains, overlaps the rear longitudinal end of an adjacent bottom plate, said first and second transverse axles being adjacent to the rear and forward longitudinal ends, respectively, of the corresponding bottom plates.

3. The combination as set forth in claim 2, further comprising a pair of wheels mounted on the ends of each said first transverse axle, and rails for said wheels extending in parallelism with said chains between the end turns of said conveyor.

4. The combination as set forth in claim 2, wherein said selected aligned pairs of studs connect said aligned links with the links located therebehind, as seen in the direction of movement of said chains.

References Cited in the file of this patent

Germany, K 13,988, Kl. 81 e 15, Jan. 12, 1956.
Germany, N 11,751, Kl. 81 e 15, Aug. 23, 1956.
Germany, U 3,181, Kl. 81 e 15, Nov. 22, 1956.